United States Patent [19]
McClure

[11] Patent Number: 5,052,608
[45] Date of Patent: Oct. 1, 1991

[54] PIPE FITTING TOOL

[76] Inventor: Gary W. McClure, Rte. 7, Box 228A, South Charleston, W. Va. 25309

[21] Appl. No.: 442,151

[22] Filed: Nov. 28, 1989

[51] Int. Cl.[5] .......................................... B23K 37/053
[52] U.S. Cl. ...................................... 228/44.5; 29/272; 228/49.3; 228/49.4; 269/43
[58] Field of Search .................... 228/49.3, 44.5, 49.4; 269/43; 29/272, 263

[56] References Cited

U.S. PATENT DOCUMENTS 3,400,872  9/1968  Rogers ............................... 228/44.5
4,769,889  9/1988  Landman et al. ................. 269/43 X

FOREIGN PATENT DOCUMENTS 477807  8/1975  U.S.S.R. ............................. 228/49.4

Primary Examiner—Kenneth J. Ramsey
Attorney, Agent, or Firm—Fleit, Jacobson, Cohn, Price, Holman & Stern

[57] ABSTRACT

A tool used in joining the adjacent ends of pipes and the like including a structural arrangement which is capable of moving the ends of the members to be joined towards and away from each other, transversely in relation to each other for alignment and adjusting the angular relation of the adjacent ends to accurately, positively, quickly and easily position adjacent ends of pipe members and the like in optimum desired relation for joining the members by welding. The tool includes a plurality of circumferentially spaced lugs mounted on each member to be joined in spaced relation to the end thereof with the ends being secured in place by a clamp structure or the like with the lugs being interconnected by turnbuckle structures having radial screw threaded members at each end thereof with manipulation of the turnbuckle structures and radial screws enabling the adjacent ends of the members to be joined to be oriented in optimum position for welding.

13 Claims, 3 Drawing Sheets

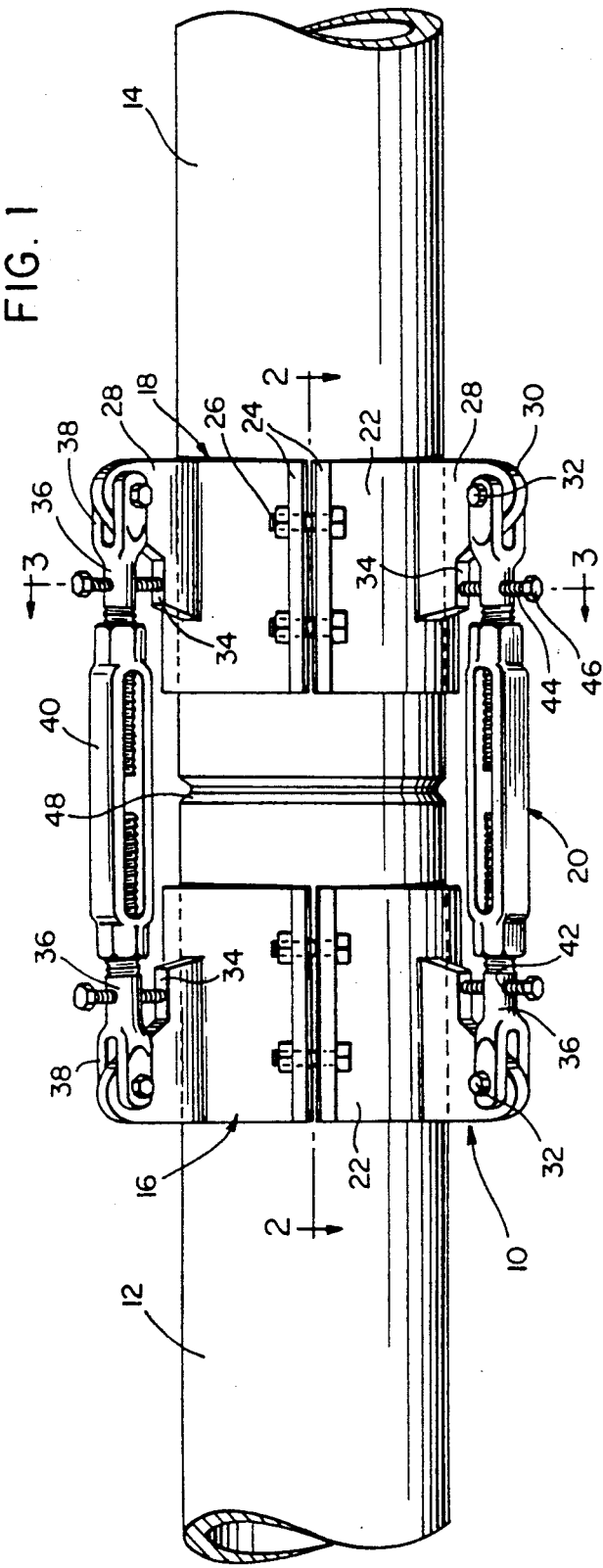
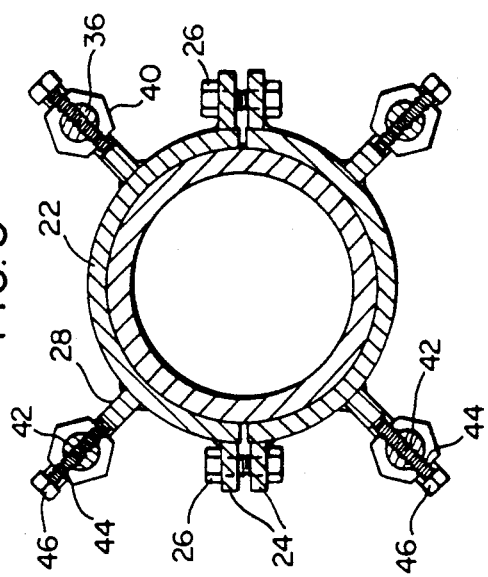
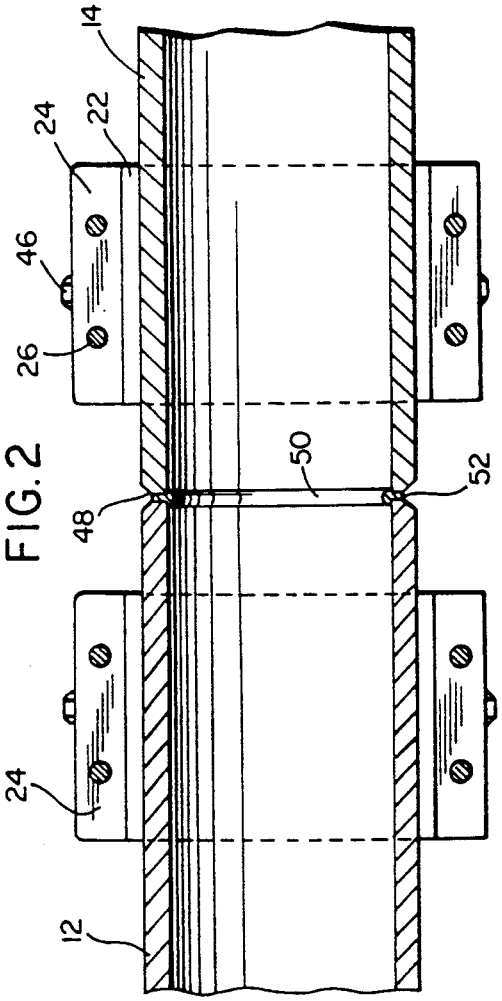

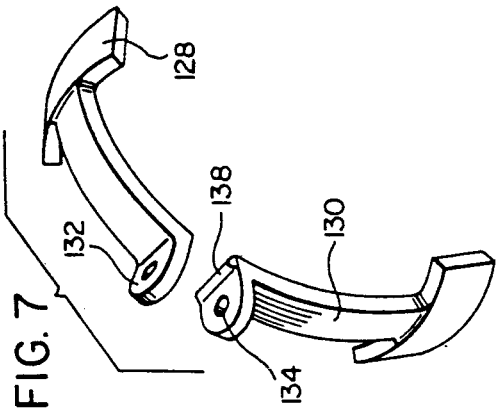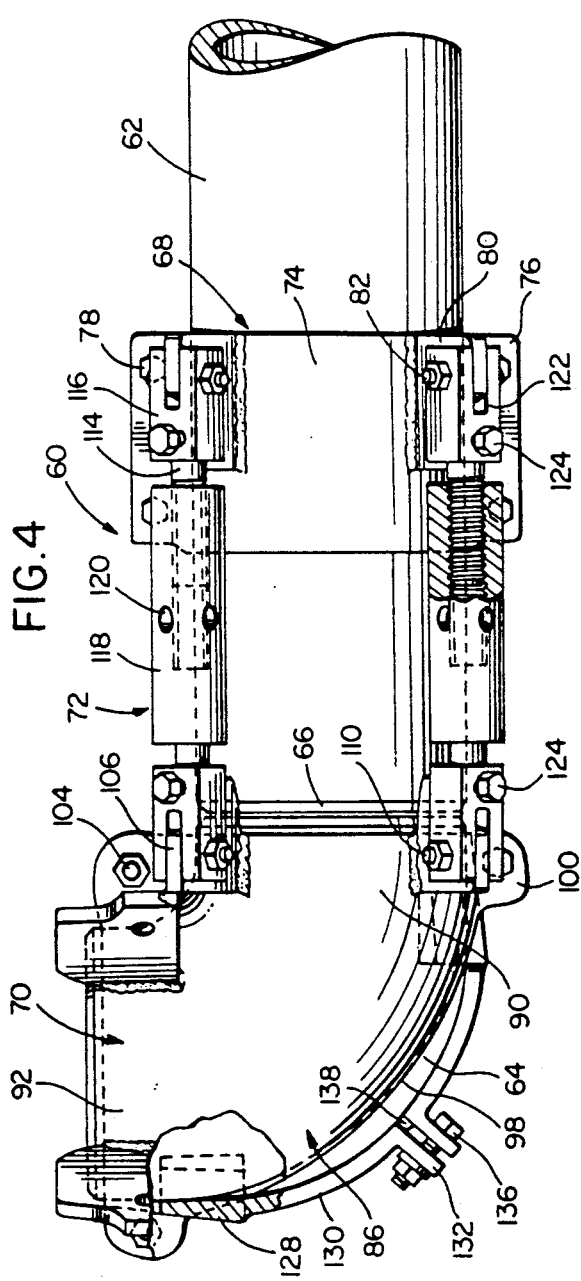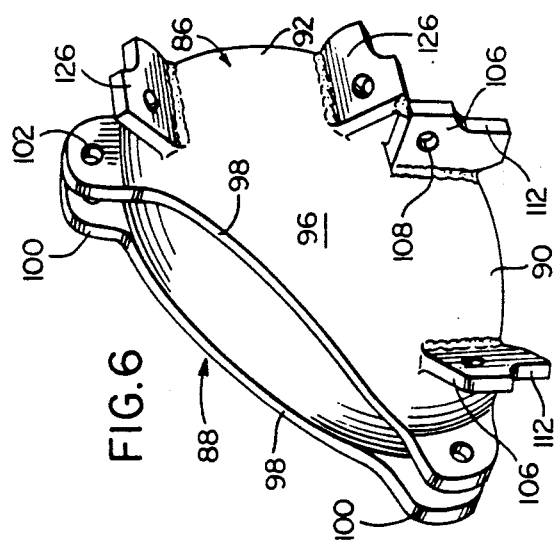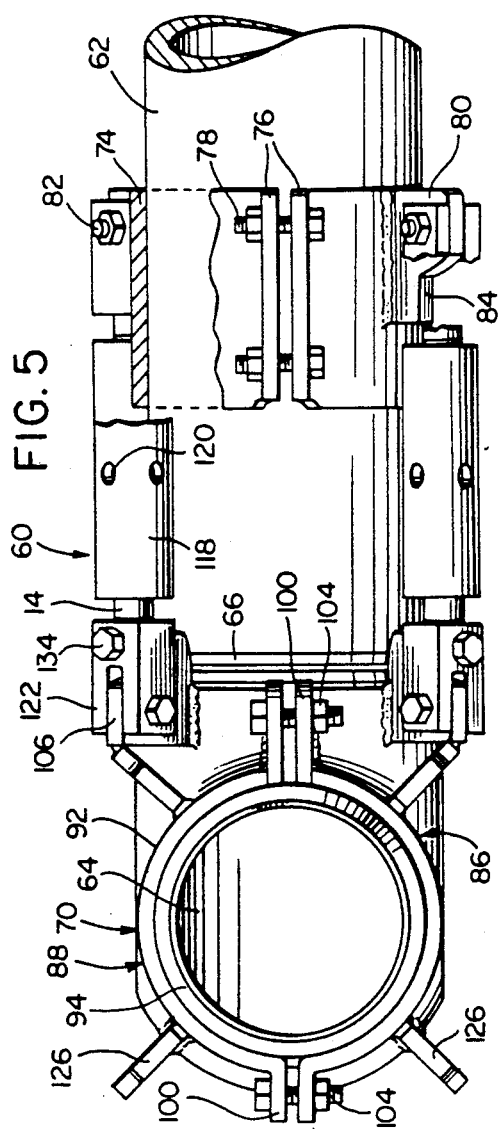

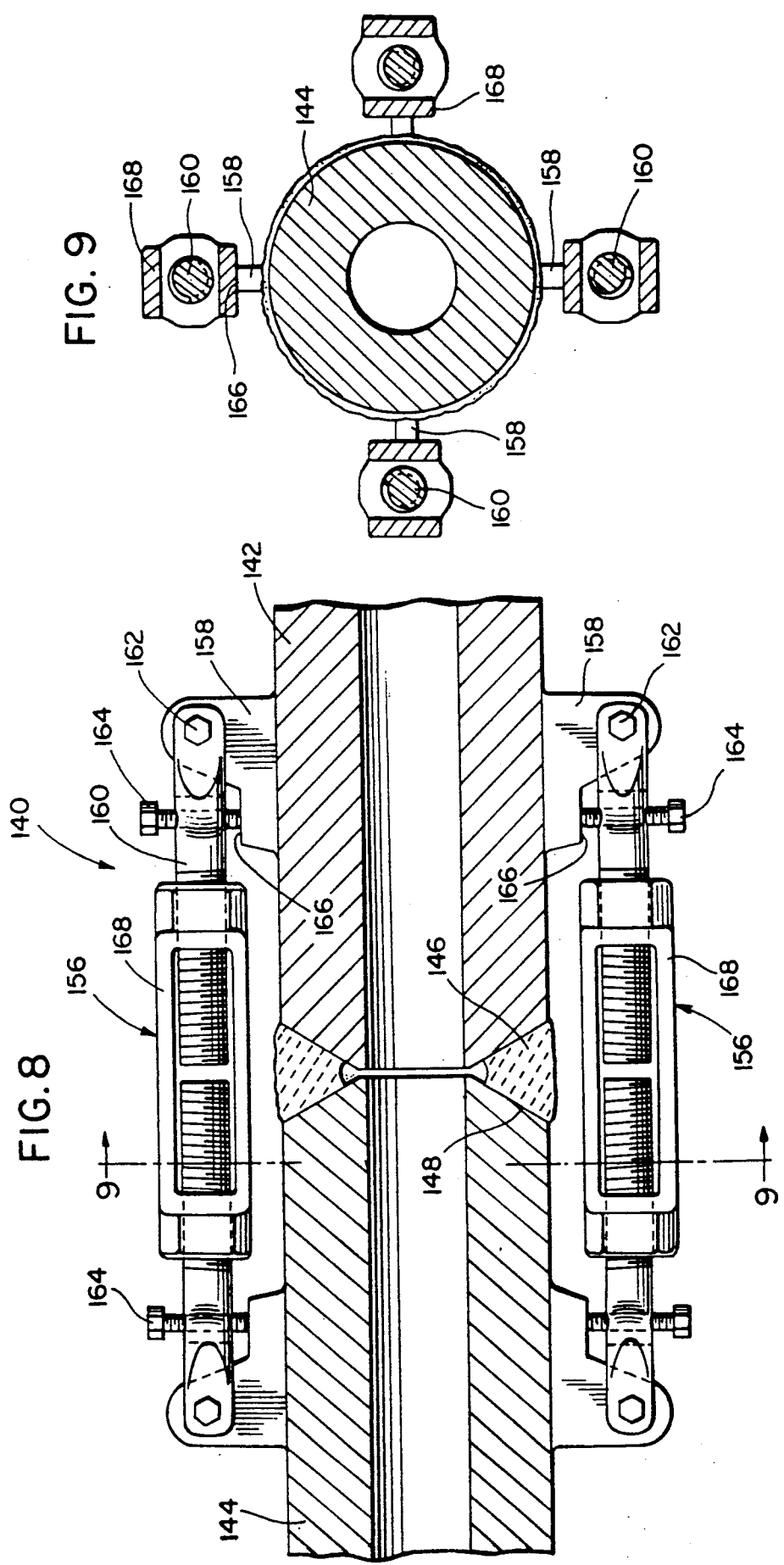

PIPE FITTING TOOL

BACKGROUND OF THE INVENTION

1. Field of the Invention

The present invention generally relates to a pipe fitting tool and more specifically a tool used in joining the adjacent ends of pipes and the like including a structural arrangement which is capable of moving the ends of the pipes to be joined towards and away from each other, transversely in relation to each other for alignment and in angular relation to each other for adjusting the angular relation of the adjacent ends to accurately, positively, quickly and easily position adjacent ends of pipes and the like in optimum desired relation for joining the pipes by welding. The tool includes a plurality of circumferentially spaced lugs mounted on each pipe to be joined in spaced relation to the end thereof with the lugs being mounted on a clamp structure or mounted directly on the pipes with the lugs being interconnected by turnbuckle structures having radial screws at each end thereof with manipulation of the turnbuckle structures and radial screws enabling the adjacent ends of the pipes to be joined by welding to be oriented in optimum position.

2. Information Disclosure Statement

My prior U.S. Pat. No. 4,846,391 issued July 11, 1989 discloses a tool for assisting in connecting tubes or pipes in a boiler tube wall and the other patents mentioned therein disclose structures to assist in positioning pipe ends to be joined by welding. In certain installations, a consummable ring is utilized in connecting special pipes such as those used in naval ship installations in which the pipe is an alloy for handling sea water and is a relatively soft copper/nickel alloy having an outside nominal diameter of 4½". The consummable ring has a very short life cycle when exposed to atmospheric conditions thus requiring that prefabricated pipe modules be fitted and joined in a relatively short period of time. Otherwise, the consummable ring must be replaced requiring that the fitting procedure be restarted. Previously existing pipe aligning and fitting tools do not include the structural features and operational capabilities of the present pipe fitting tool.

SUMMARY OF THE INVENTION

An object of the present invention is to provide a pipe fitting tool for use in fitting prefabricated pipe modules in which the pipes are of unique construction and, when welded, a consummable inner ring is provided in the joint between adjacent pipes with the tool of this invention being capable of quickly and accurately positioning adjacent ends of adjacent pipe members in optimum relation to be joined by welding.

Another object of the invention is to provide a pipe fitting tool in accordance with the preceding object in which the tool includes a plurality of circumferentially spaced lugs secured to the end portions of pipe members to be joined together by welding with means interconnecting aligned lugs to move the ends towards and away from each other and vary the angular relation therebetween with the means also including a structure to laterally shift the pipe ends in relation to each other for optimum alignment and positioning of the pipe ends for joining by welding.

A further object of the invention is to provide a pipe fitting tool in accordance with the preceding objects which can be used to join straight pipe members or various combinations of tee-fittings, ell-fittings and straight pipe segments in which the tool is relatively simple in construction but yet effective for quickly and positively positioning the members to be joined and securely retaining them in optimum position.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the pipe fitting tool of the present invention associated with straight line pipe sections to be joined by welding.

FIG. 2 is a longitudinal, sectional view taken substantially upon a plane passing along section line 2—2 on FIG. 1 illustrating structural details of the pipe fitting tool and the association of the clamps with the pipe sections.

FIG. 3 is a transverse, sectional view taken substantially upon a plane passing along section line 3—3 on FIG. 1 illustrating further structural details of the pipe fitting tool.

FIG. 4 is an elevational view of an embodiment of the pipe fitting tool for connecting an ell-fitting to a straight pipe section.

FIG. 5 is a top plan view of the construction of FIG. 4 illustrating further structural details thereof.

FIG. 6 is a perspective view illustrating the structure of the clamp for engagement with the ell-fitting with the structure also enabling a tee-fitting or other similar fitting to be effectively clamped.

FIG. 7 is a perspective view of a portion of the clamp for the ell-fitting to tighten the clamp effectively in relation to the ell-fitting.

FIG. 8 is an elevational view of another embodiment of the pipe fitting tool of this invention.

FIG. 9 is a transverse, sectional view taken substantially upon a plane passing along section line 9—9 on FIG. 8 illustrating further structural details of this embodiment of the invention.

DESCRIPTION OF THE PREFERRED EMBODIMENTS

Referring now specifically to FIGS. 1-3 of the drawings, the pipe fitting tool of the present invention is generally designated by reference numeral 10 and is illustrated for connecting two straight pipe sections 12 and 14. The tool 10 includes a pair of pipe clamps 16 and 18 which are interconnected by turnbuckles 20 which are circumferentially spaced about the clamps 16 and 18.

The clamps 16 and 18 are identical and include two semi-cylindrical segments 22 with each segment including a pair of outwardly projecting edge flanges 24 which are interconnected by bolts 26 to secure the generally semi-cylindrical segments 22 in clamping relation to the cylindrical pipe section. Each semi-cylindrical segment 22 includes a pair of circumferentially spaced laterally extending lugs 28.

Each of the lugs 28 includes a radially extending ear 30 at one end thereof with the ear 30 being apertured to receive a pivot bolt 32 connecting the turnbuckle 20 thereto. The end of the lug 28 having the ear 30 thereon is generally in alignment with the end edge of the semi-cylindrical clamp segment 22. The other end of the lug 28 is provided with an inwardly offset longitudinally extending abutment surface 34 which generally parallels the longitudinal axis of the pipe sections 12 and 14 and the external surface of the semi-cylindrical clamp segment 22.

Each turnbuckle 20 includes a threaded yoke or clevice 36 having a bifurcated end 38 straddling the ear 30 and receiving the pivot bolt 32 therethrough. The other end of the threaded member 36 is threaded into a rotatable central member 40 with the threaded engagement between the central member 40 and the threaded members 36 being such that rotation of the central member 40 in one direction will move the threaded members 36 toward each other and rotation of the central member 40 in the opposite direction will move the members 36 apart. The structure of the turnbuckles 20 are conventional except that each of the threaded members 36 includes a diametrically extending internally threaded bore 42 therethrough receiving a radially extending screw threaded member 44 having a polygonal head 46 disposed on the outer end thereof with the inner end of the screw threaded member abutting the surface 34. With this construction, selective screws 44 are threaded inwardly and outwardly in a manner to shift the pipe sections 12 and 14 laterally in relation to each other so that the beveled ends 48 to be welded together can be laterally shifted in any direction in relation to each other to properly align the beveled ends 48. By rotating the rotatable components of the turnbuckles 20 in selected directions, the pipe sections 12 and 14 can be moved axially or longitudinally in relation to each other to space the beveled ends 48 of the pipe sections 12 and 14 in optimum relation for welding. Also, selective rotation of the rotatable components 40 of the turnbuckles 20 enables the angular relation of the pipe sections 12 and 14 to be adjusted to position the beveled ends 48 in parallel relation or in some desired angular relation although it is usual for the beveled ends 48 to be accurately oriented in parallel, slightly spaced relation to receive a consummable insert or inner ring 50 which has a central flange 52 projecting between the spaced beveled ends 48 of the pipe sections 12 and 14 as illustrated in FIG. 2.

Referring now specifically to FIGS. 4-7, another embodiment of the pipe fitting tool is illustrated and designated by reference numeral 60 for joining a pipe section 62 to an ell-fitting or elbow 64 both of which include beveled ends 66 to be joined by welding. The tool includes a clamp 68 mounted on the pipe section 62 and a clamp 70 mounted on the ell-fitting 64 with turnbuckles generally designated by numeral 72 interconnecting the clamps 68 and 70 to quickly and accurately position the beveled ends 66 of the pipe section 62 and fitting 64.

The clamp 68 includes a pair of semi-cylindrical clamp members 74 having lateral flanges 76 at the ends thereof interconnected by bolts 78 to securely mount the clamp 68 to the pipe section 62 in the same manner that the clamp members are secured to the pipe sections in FIGS. 1-3. Equally spaced radially extending lugs 80 are mounted exteriorly at one end of the clamp 68 with the outer end portion of the lug 80 being apertured to receive a pivot bolt 82 for connecting the turnbuckle structure to the clamp 68. The end of the lug 80 remote from the pivot bolt 80 is provided with an abutment surface 84 extending axially or longitudinally in generally parallel relation to the axis of the pipe section 62 and the external surface of the clamp member 74.

The clamp 70 includes a pair of clamp members 86 and 88 which are mirror images of each other as illustrated in FIG. 6 with each clamp member including a pair of semi-cylindrical end portions 90 and 92 which are oriented in perpendicular relation to each other in a manner similar to the perpendicularly arranged end edges 94 of the ell-fitting 64. Each clamp member 86 includes an arcuate central body 96 and curved edges 98 which engage the external surface of the ell-fitting 64. The ends of the curved edges 98 include outwardly extending flanges 100 which are apertured at 102 to receive clamp bolts 104 to clamp the clamp members 86 to the ell-fitting 64. Also, the semi-cylindrical end portion 90 is provided with radially extending lugs 106 similar to the lugs 80 and also similar to the lugs 28 in FIGS. 1-3. Each of the lugs 90 includes an apertured ear portion 108 for receiving a pivot bolt 110 in the same manner that lug 80 receives pivot bolt 82 and the opposite end of the lug 108 is provided with a recess abutment surface 112 that generally parallels the axis of the pipe section 62 and the adjacent portion of the ell-fitting 64 and the external surface of the semi-cylindrical end 90 of the clamp members 86 and 88 thus enabling the turnbuckle 72 to be connected between aligned pairs of lugs 80 and 106.

The turnbuckle 72 includes a pair of threaded members 114 having a bifurcated end 116 straddling the lugs 80 and lugs 106 for pivotal connection therewith by the pivot bolts 82 and 110, respectively. The threaded members 114 are interconnected by a rotatable internal threaded member 118 engaging the screw threaded portion so that rotation in one direction will move the clamp members 68 and 70 towards each other and away from each other when the rotatable members are rotated in the opposite direction with the rotatable central member 118 being cylindrical and provided with radial apertures 120 to receive a tool for rotating the member 118 when necessary. Threaded through the yoke or clevice 116 is a screw 122 having a polygonal head 124 with the inner end thereof engaging the abutment surface 112. By manipulation of the screws 122, the beveled end 66 of the pipe section 62 and the ell-fitting 64 can be moved laterally to be oriented in accurate aligned relation. By manipulation of the turnbuckle 72, the beveled end edges of the pipe section and fitting can be moved toward and away from each other and the angular relation between the end edges may be varied between parallel relation and an angular relation within the limits of movement of the turnbuckle and within limits determined by the requirements of the installation.

As illustrated in FIG. 6, the semi-cylindrical end portion 92 of the clamp member 86 also includes lugs 126 which correspond to the lugs 106 which enable another straight pipe section or another fitting to be connected to the fitting 64 by welding with the turnbuckle structure and clamp structure being duplicated thus enabling various pipe arrangements to be assembled. FIG. 7 illustrates a pair of wedges 128 of arcuate configuration which fit between the exterior surface of the ell-fitting 64 and the semi-cylindrical end portions 90 and 92 adjacent the flanges 100 for tightening the ell-fitting 64 in relation to the clamp members 86 and 88. The wedge member 128 is arcuate and provided with a central arcuate leg 130 which extends laterally from the thicker end of the wedge 128 with the end of the leg 130 opposite the wedge 128 including a laterally extending lug 132 having an aperture 134 therein for receiving a bolt 136. One of the flanges 132 is provided with a projecting rib 138 at its inner edge which forms a fulcrum point to move the wedges laterally outwardly as the legs 130 fulcrum about the rib 138 when the bolt 136 is tightened thereby causing the wedges 128 to fulcrum to exert inward force on the fitting 64 and outward force on the inner surface of the clamp members 86 and 88 adjacent the flanges 100 thus securely clamping the ell-fitting 64 rigidly and immovably in relation to the clamp structure 70 to positively move the fitting and retain it in position when welding the beveled edges 66.

FIGS. 8 and 9 of the drawings disclose another embodiment of the invention designated by reference numeral 140 in which pipe sections 142 and 144 are joined by welding 146 between beveled edges 148 of a thick walled pipe or the like. In this construction, four equally spaced turnbuckles 156 extend between lugs 158 that are welded to the pipe sections 142 and 144 with the lugs 158 being substantially the same as the lugs 106, 80 or 28 with threaded members 160 of the turnbuckle 156 being connected thereto by a pivot bolt 162 and a threaded screw 164 extending therethrough for engagement with an abutment surface 166 on the lug 158 thus enabling lateral adjustment of the pipe sections 142 and 144 with the rotatable central member 168 of the turnbuckle 156 enabling adjustment axially and angularly between the pipe sections 142 and 144 for optimum alignment during welding. The turnbuckles 156, lugs 158 and radial screws 164 function in the same manner as in FIGS. 1-7 with two of the turnbuckles serving as fulcrums and the other two turnbuckles exerting force to manipulate the pipe sections. After the welding operation has been completed, the lugs 158 and turnbuckles 156 may be removed from the pipe sections.

While a manually rotatable central member is illustrated in association with the turnbuckles, various well-known devices may be utilized in association with the turnbuckles for ease of adjustment. A ratchet structure with a laterally extending handle, commonly referred to as a steamboat ratchet, may be utilized on the rotatable member to facilitate rapid adjustment thereof with the laterally extending handle providing sufficient torque to adjust pipe sections or other members to be joined together. In addition, the mechanically operated turnbuckles may be removed and hydraulic rams employed in lieu thereof with a manually operated pump or other pressure source connected thereto with suitable valves to individually control the hydraulic rams for functioning in a manner equivalent to the turnbuckles. The various components such as the bolts, nuts and the like may be provided with structures to capture and retain these components thereby eliminating loose parts which could possibly fall into one of the pipes or in other areas in which the pipe modules are installed on board ship or in any other installation. Quick fastener arrangements, ratchet devices and the like, may be utilized in lieu of bolts depending upon the installational requirements. To provide more rapid assembly of the clamp members, rather than using flanges and bolts on diametrically opposed edges thereof, the semi-cylindrical members may have one edge thereof provided with a hook and groove arrangement to connect that edge of the clamp members with the opposite edge having flanges and bolts or other fastening members with the hook and groove arrangement in effect forming a hinged connection between the semi-cylindrical clamp members.

The clamp structure 70 illustrated in FIGS. 4-7 can be utilized with the ell-fitting 64 as illustrated or with a tee-fitting in which one branch of the tee-fitting can extend between the arcuate edges 98 on the clamp members 86 and 88 in which event the wedge structures illustrated in FIG. 7 would be omitted.

The use of the pipe fitting tool of this invention enables the major portion of the alignment procedure to be completed before insertion of the consumable ring 52 which is constructed of a material that will corrode from contact with atmospheric conditions in a matter of several hours and then cannot be used thus requiring that the fitting or set-up procedure be restarted when using conventional techniques. By using the tool of this invention, the set-up and fitting of pipe sections for joining by welding can be done in substantially less time than is critical for the consummable ring to be exposed to atmosphere especially when considering that the major portion of the fitting or set-up can be completed prior to the inner ring being inserted between the adjacent ends of the pipe sections or pipe section and fitting. The large surface areas of the clamp structure which engage the pipe enable the pipe sections to be aligned without damage to the exterior surface of the pipe sections which is an important function when used with copper/nickel alloy pipes utilized to convey sea water in installations on board ship which pipe sections have a relatively soft external surface.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A pipe fitting tool for positioning the adjacent ends of pipe sections in optimum relation for joining by welding comprising means securely fixed to each of said adjacent ends, adjusting means interconnecting the means fixed to the adjacent ends at circumferentially spaced points to adjust the adjacent ends axially in relation to each other and angularly in relation to each other and radially extending adjustment means engaging the adjusting means and the means fixed to said adjacent ends to move the adjacent ends laterally in relation to each other for aligning the adjacent ends, moving them axially and adjusting their angular relation, said means fixed to said adjacent ends including a clamp structure including two generally semi-cylindrical segments clamped to said adjacent ends with radially extending lugs thereon for connection with said adjusting means, one of said clamp structure being of right angular configuration for clamping engagement with angled branches of a pipe fitting.

2. The structure as defined in claim 1 wherein said adjusting means includes extendable and retractable means interconnecting the means fixed to said adjacent ends with at least three adjusting means disposed circumferentially in equally spaced relation around the periphery of the pipe sections.

3. The structure as defined in claim 2 wherein said extendable and retractable means includes a turnbuckle structure having the ends thereof pivotally connected to said mountable means fixed to said adjacent ends.

4. The structure as defined in claim 1 wherein said radial adjustment means includes a manually operated radial screw in screw threaded engagement with the adjusting means and in abutting engagement with the means fixed to said adjacent ends with the radial screws being rotated in selected directions to shift the adjacent ends laterally in relation to each other.

5. A pipe fitting tool for positioning the adjacent ends of pipe sections in optimum relation for joining by welding comprising a plurality of circumferentially spaced mounting means securely fixed to each of said adjacent ends, said mounting means on one pipe section being in axial alignment with the mounting means on the other pipe sections, axially extending adjusting means interconnecting the mounting means fixed to the adjacent ends at circumferentially spaced points to adjust the adjacent ends axially in relation to each other and angularly in relation to each other and radially extending adjustment means mounted on each end of each adjusting means and extending into engagement with said mounting means, each of said adjustment means being a screw threaded member threaded through the adjusting means and including an inner end abutting the mounting means to move the adjacent ends laterally in relation to each other for aligning the adjacent ends, moving them axially and adjusting their angular relation.

6. The structure as defined in claim 5 wherein said mountable means fixed to said adjacent ends includes a clamp structure including two generally semi-cylindrical segments clamped to said adjacent ends with radially extending lugs thereon for connection with said adjusting means.

7. The structure as defined in claim 5 wherein said mounting means fixed to said adjacent ends includes a plurality of equally spaced radial lugs welded to said adjacent ends, said adjusting means including at least one extendable and retractable means interconnecting each pair of aligned lugs on the adjacent ends to adjust the adjacent ends in relation to each other, said radial screw threaded members extending through the extendable and retractable means and abuttingly engaging said lugs on the adjacent ends to move the adjacent ends laterally in relation to each other.

8. A pipe fitting tool for positioning the adjacent ends of pipe sections in optimum relation for joining by welding comprising means securely fixed to each of said adjacent ends, adjusting means interconnecting the means fixed to the adjacent ends at circumferentially spaced points to adjust the adjacent ends axially in relation to each other and angularly in relation to each other and radially extending adjustment means engaging the adjusting means and the means fixed to said adjacent ends to move the adjacent ends laterally in relation to each other for aligning the adjacent ends, moving them axially and adjusting their angular relation, said adjusting means including extendable and retractable means interconnecting the means fixed to said adjacent ends with at least three adjusting means disposed circumferentially in equally spaced relation around the periphery of the pipe sections, said means fixed to said adjacent ends including a clamp structure including two generally semi-cylindrical segments clamped to said adjacent ends with radially extending lugs thereon for connection with said adjusting means, one of said clamp structure being of right angular configuration for clamping engagement with angled branches of a pipe fitting.

9. The structure as defined in claim 8 wherein said radial adjustment means includes a manually operated radial screw in screw threaded engagement with each end of each adjusting means and in abutting engagement with the means fixed to said adjacent ends with the radial screws being rotated in selected directions to shift the adjacent ends laterally in relation to each other.

10. The structure as defined in claim 5 wherein said screw threaded members on one pipe section are in axial alignment with the screw threaded members on the other pipe section, each of said mounting means including a radially and longitudinally extending lug rigid with the pipe section with the lug including an axially extending, radially outwardly facing surface on the end portion of the lug adjacent the ends of the pipe sections, each of said adjusting means including an axially extendable and retractable turnbuckle having bifurcated yoke ends, means pivoting the yoke ends to the lugs for pivotal movement of the yoke ends in relation to the lugs about axes perpendicular to the longitudinal axis of the pipe sections, said radial screw threaded members being screw threaded through the bifurcated yoke ends in spaced relation to the pivotal connection between the yoke ends and lugs with the inner end of each of the screw threaded members abuttingly engaging the axial outwardly facing surface on the lugs to vary the angular relationship between the turnbuckles and longitudinal axis of the pipe sections.

11. The structure as defined in claim 10 wherein said lugs are welded onto the pipe sections.

12. The structure as defined in claim 10 wherein said lugs are mounted on segmental clamp members disposed in encircling relation to and fixedly clamped to the adjacent ends of adjacent pipe sections.

13. The structure as defined in claim 12 wherein said clamp members on one pipe section is of angular configuration to enable it to be fixedly clamped to an angled pipe section.

* * * * *